(12) United States Patent
Holmquist

(10) Patent No.: US 7,226,214 B2
(45) Date of Patent: * Jun. 5, 2007

(54) FIBEROPTIC CONNECTOR AND METHODS

(75) Inventor: Marlon E. Holmquist, Gibbon, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/881,260

(22) Filed: Jun. 30, 2004

(65) Prior Publication Data

US 2004/0234207 A1    Nov. 25, 2004

Related U.S. Application Data

(63) Continuation of application No. 09/967,491, filed on Sep. 28, 2001, now Pat. No. 6,758,601.

(51) Int. Cl.
*G02B 6/38* (2006.01)

(52) U.S. Cl. .............. 385/75; 385/55; 385/53

(58) Field of Classification Search ........ 385/75, 385/53, 55, 76, 77, 78, 80, 81, 84, 86, 87, 385/88, 92, 94, 139, 12; 606/15, 16; 372/6, 372/34, 35, 36
See application file for complete search history.

(56) References Cited

U.S. PATENT DOCUMENTS

| | | | | |
|---|---|---|---|---|
| 3,893,340 A * | 7/1975 | Parker | ................ | 374/161 |
| 4,496,211 A * | 1/1985 | Daniel | ................ | 385/31 |
| 5,065,448 A * | 11/1991 | Ortiz, Jr. | ................ | 385/53 |
| 5,134,675 A | 7/1992 | Poli et al. | ................ | 385/70 |
| 5,363,460 A | 11/1994 | Marazzi et al. | ................ | 385/70 |
| 5,420,951 A | 5/1995 | Marazzi et al. | ................ | 385/75 |
| 5,446,819 A * | 8/1995 | Foster et al. | ................ | 385/80 |
| 5,506,922 A | 4/1996 | Grois et al. | ................ | 385/75 |
| 5,675,682 A * | 10/1997 | De Marchi | ................ | 385/77 |
| 5,692,080 A | 11/1997 | Lu | ................ | 385/60 |
| 5,883,995 A * | 3/1999 | Lu | ................ | 385/60 |
| 6,004,031 A * | 12/1999 | Takayama et al. | ................ | 374/131 |
| 6,081,647 A | 6/2000 | Roth et al. | ................ | 385/139 |
| 6,142,676 A | 11/2000 | Lu | ................ | 385/60 |
| 6,758,601 B2 * | 7/2004 | Holmquist | ................ | 385/75 |

FOREIGN PATENT DOCUMENTS

| | | |
|---|---|---|
| DE | 296 14 436 U1 | 11/1996 |
| EP | 0 426 149 A | 5/1991 |
| EP | 0 613 030 A2 | 8/1994 |
| GB | 2 300 978 A | 11/1996 |
| WO | WO 99 57592 A | 11/1999 |

OTHER PUBLICATIONS

Allowed Claims from U.S. Appl. No. 09/967,491.

* cited by examiner

*Primary Examiner*—Arnel Lavarias
(74) *Attorney, Agent, or Firm*—Merchant & Gould P.C.

(57) ABSTRACT

A fiberoptic connector is constructed entirely of metal and includes structure to radiate heat. Preferably, the fiberoptic connector also includes an arrangement to indicate whether the fiberoptic connector is holding an energized optical fiber. Preferably, the heat radiating structure includes fin structure and a metal stamping projecting from the connector housing. The indicating arrangement preferably is a temperature sensitive strip secured to the housing, which changes color based upon the heat radiated by the optical fiber carried within. Methods of indicating an energized fiberoptic connector and of dissipating heat from a fiberoptic connector are provided.

44 Claims, 8 Drawing Sheets

FIBEROPTIC CONNECTOR AND METHODS

This application is a continuation of application Ser. No. 09/967,491, filed Sep. 28, 2001, to issue as U.S. Pat. No. 6,758,601 on Jul. 6, 2004. application Ser. No. 09/967,491 is incorporated herein by reference.

TECHNICAL FIELD

This disclosure relates to fiberoptic connectors. In particular, this disclosure concerns fiberoptic connector constructions and methods that may be used across a range of powers, e.g., 500 milliwatts to 2 watts.

BACKGROUND

In fiberoptic communications, there are situations when it is desired to send a signal over a long distance, for example, from the east coast to the west coast of the United States. In such situations, repeater stations are utilized every 500 miles or so. The repeater stations read the signal and repeat the signal. Repeater stations are needed because the power being transmitted along the fiber is not great enough to be able to sustain and transmit the signal over the very long distance of several thousands of miles.

The use of repeater stations is expensive. Thus, it is desired to minimize the number of repeater stations that are needed. One way of minimizing the number of repeater stations needed is by transmitting high powers through each optical fiber. In previously used systems, powers along the range of up to about 400 milliwatts are utilized.

Higher powers transmitted through optical fibers are more dangerous than lower powers. Improvements in fiber optic connectors are desired to ensure safety for operators and equipment when transmitting powers greater than 400 milliwatts.

SUMMARY

In one aspect, this disclosure describes a fiberoptic connector suitable for use across a range of powers, for example, in the range of 500 milliwatts and up, such as up to 2 watts. In general, one embodiment of a fiberoptic connector is disclosed as including a connector housing defaming an interior volume sized to hold an optical fiber and an opening in communication with the interior volume. An optical fiber is oriented within the interior volume of the connector housing. A temperature indicator is secured to the connector housing.

In one embodiment, the connector housing includes a plurality of fins projecting from the housing wall, and the connector housing comprises metal. In a preferred embodiment, there is a cover pivotally connected to the connector housing. Preferably, this cover comprises metal. Preferably, in some embodiments, there is a stamping secured to and projecting from the connector housing. Preferably, this stamping comprises metal.

In another aspect, a method for indicating an energized fiber optic connector is disclosed. The method includes a step of providing a fiberoptic connector including a housing holding an optical fiber therewithin, sensing a temperature of the fiberoptic connector, and providing a signal when the temperature of the fiberoptic connector crosses a threshold.

In another aspect, this disclosure describes a method of dissipating heat from a fiberoptic connector. The method includes a step of providing a fiberoptic connector including a metal housing holding an energized optical fiber, wherein the housing includes a plurality of fins and a metal stamping secured to and projecting from the housing. Heat generated by the energized optical fiber is radiated through the metal housing, the plurality of fins, and the metal stamping.

DETAILED DESCRIPTION

A. Some Problems with Existing Arrangements.

Existing fiberoptic connectors are often made from injection molded plastic. When such injection molded constructions carry high intensity fibers, the energy emitted from the optical fiber causes the injection molded housing to increase in temperature. Such increases in temperature can sometimes cause the injection molded housing to melt. Of course, such melting can damage equipment and can lead to fires.

Some existing connectors are made from metal. It has been found, however, that such metal connectors, when carrying high intensity fibers, do not adequately dissipate heat transmitted to them from the fibers. Because the heat is not dissipated, these all metal constructions can start fires.

Further problems with existing fiberoptic connectors include the fact that there is no way of easily knowing whether the fiberoptic cable within the connector is energized. In past arrangements, the person inspecting would sometimes view the end of the optical fiber to determine whether it was transmitting power. In such situations, if the optical fiber is carrying high intensity power, this type of visual inspection can cause damage to the person's eye.

B. The Embodiment of FIGS. 1–8.

One embodiment of a fiberoptic connector is shown generally in the FIGS. at 10. In general, the fiberoptic connector 10 is preferably constructed to address the problems of the existing arrangements discussed above. In particular, in preferred embodiments, the fiberoptic connector 10 includes an indicating arrangement 12 to communicate to a person that an optical fiber being carried by the connector 10 is energized. Further, in many preferred embodiments, the fiberoptic connector 10 includes heat radiating structure 14 that is constructed and arranged to dissipate heat generated by an energized optical fiber carried by the connector 10. In preferred embodiments, the fiberoptic connector 10 is constructed entirely of metal, such that it will not melt from the heat generated by the optical fiber.

Figure 1:
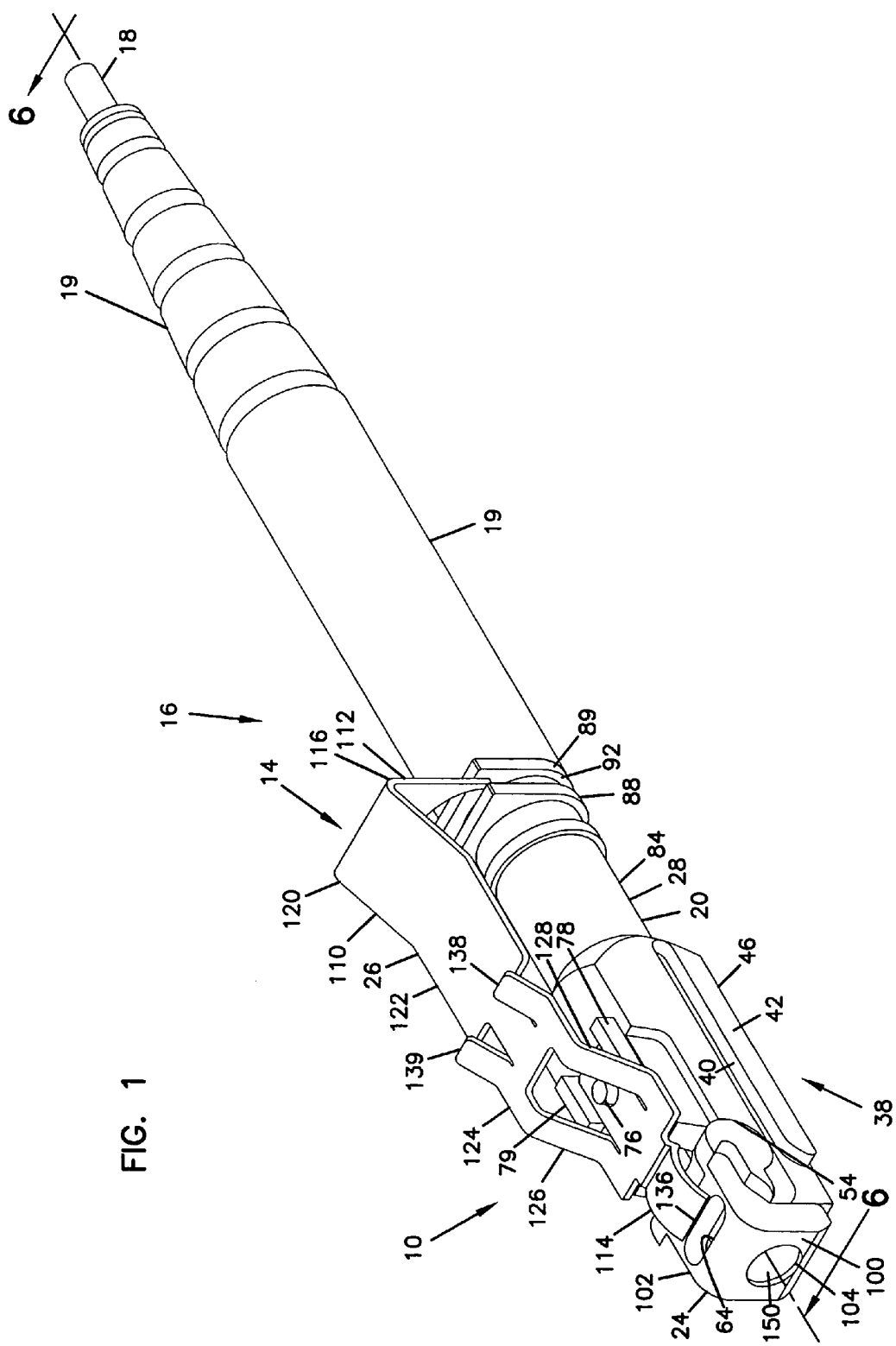
FIG. 1 is a perspective view of an embodiment of a fiberoptic connector housing and cable assembly constructed according to principles of this disclosure.
Figure 2:
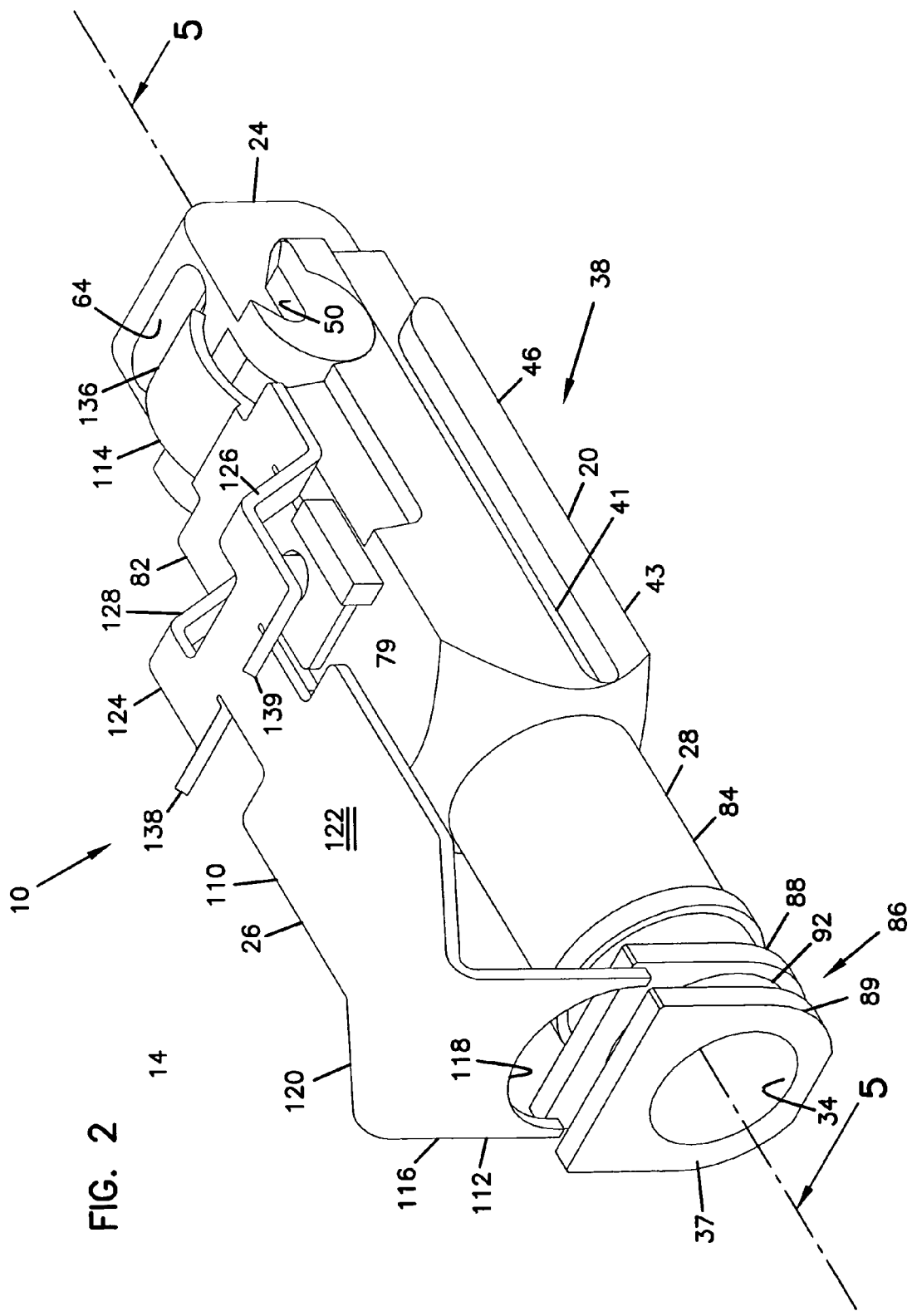
FIG. 2 is a perspective view of only the fiberoptic connector housing assembly of FIG. 1.
Figure 6:
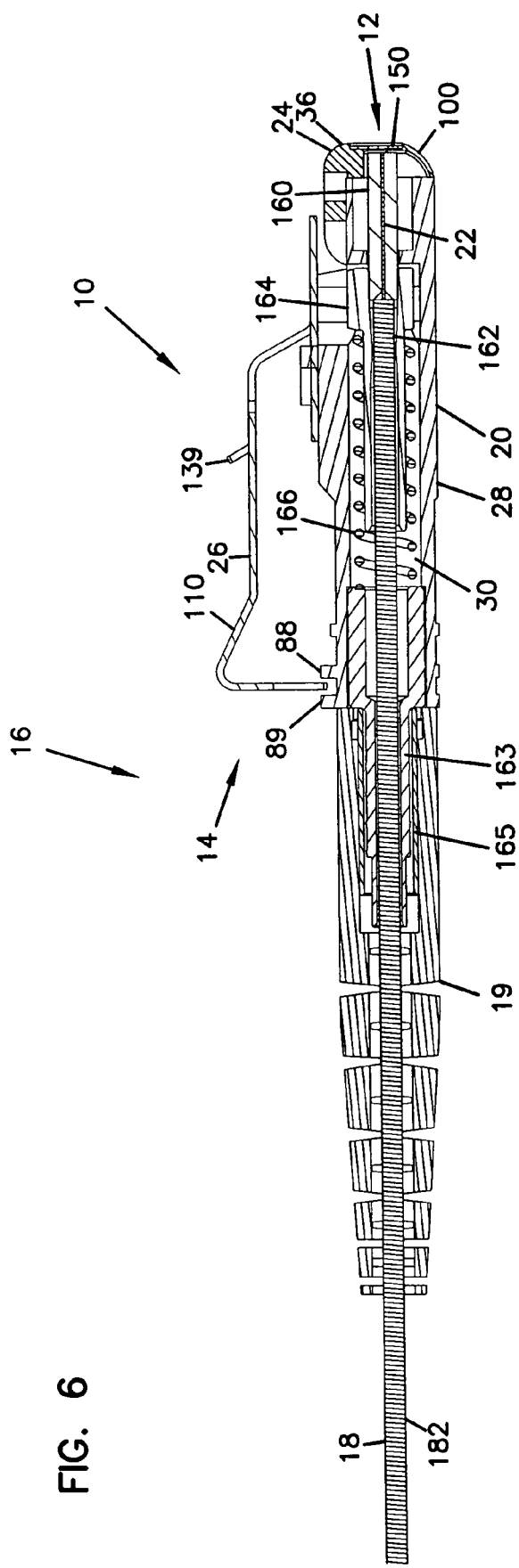
FIG. 6 is a cross-sectional view of the fiberoptic connector housing and cable assembly of FIG. 1; the cross-section being taken along the line 6—6 of FIG. 1.
Figure 7:
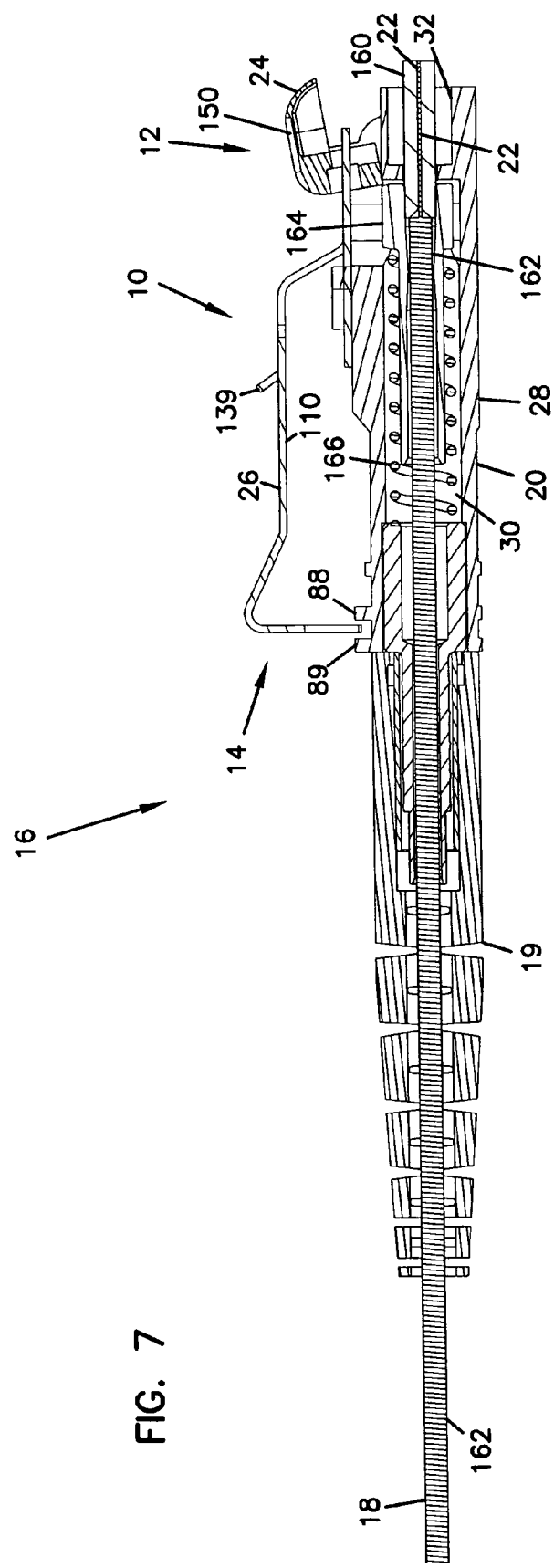
FIG. 7 is a cross-sectional view of the fiberoptic connector housing and cable assembly of FIG. 1 similar to FIG. 6, but showing a cover on the housing in an open position.

In reference now to FIG. 1, a fiberoptic connector housing and cable assembly is shown in general at 16. In the embodiment illustrated, the assembly 16 includes the fiberoptic connector 10 and a fiber optic cable 18. A strain-relief boot 19 is shown in FIGS. 1, 6, and 7 protecting the cable 18 from sharp bends.

The fiberoptic connector 10 includes a housing 20 that holds an optical fiber 22 (FIGS. 6 and 7) therewithin. Also visible in the particular embodiment illustrated in FIG. 1 is a door or cover 24 connected to the connector housing 20, as well as a stamping 26 secured to and projecting from the connector housing 20.

The connector housing 20 includes a surrounding wall 28 that defines an interior volume 30 (FIG. 5) that is sized to hold the optical fiber 22. The wall 28 also defines a front opening 32 (FIGS. 3 and 7), which is in communication with the interior volume 30. The wall 28 also defines a rear opening 34 (FIGS. 4 and 5), which allows the optical cable 18 to exit from the housing 20.

Figure 3:
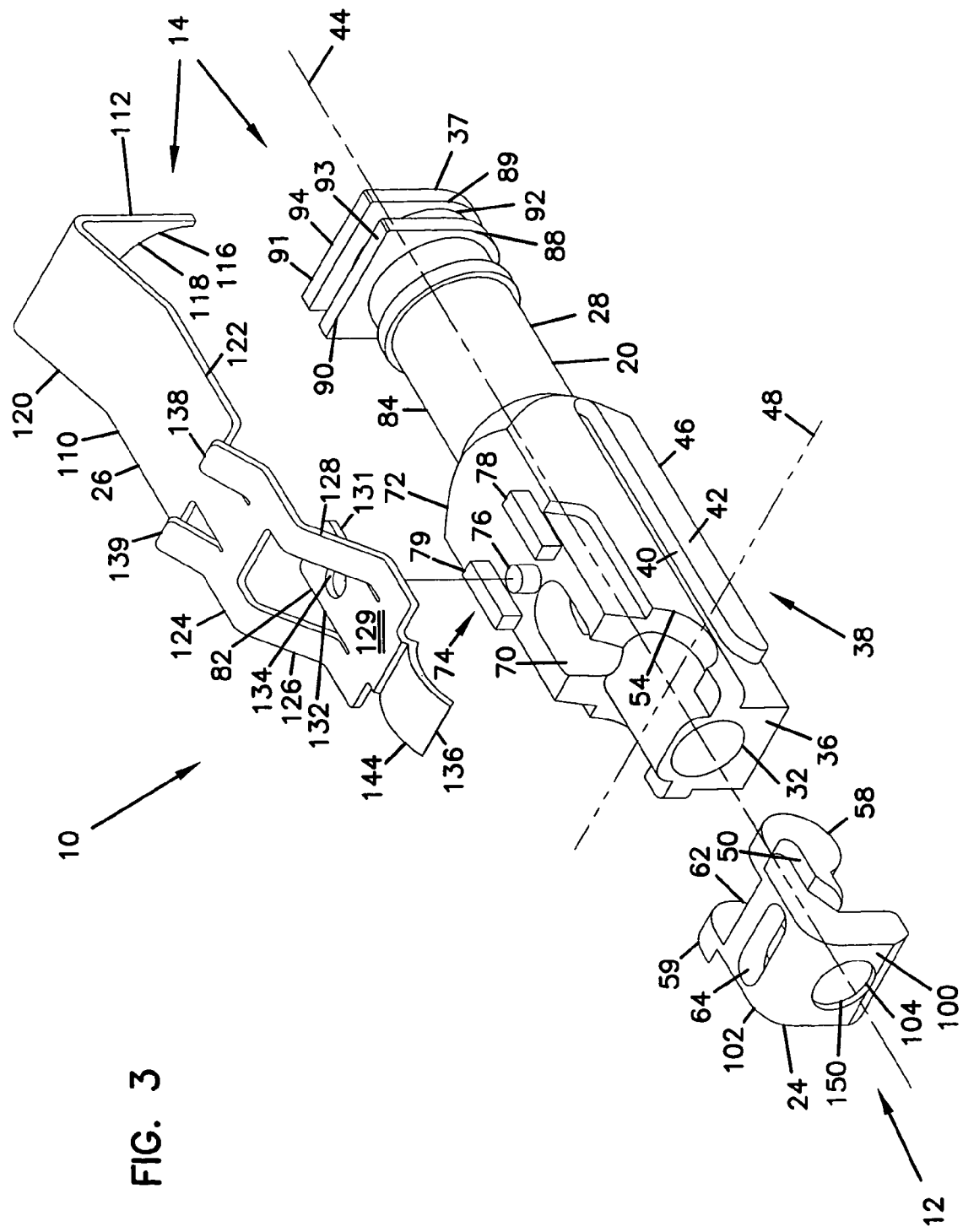
FIG. 3 is an exploded, top, front perspective view of the fiberoptic connector housing assembly of FIGS. 1 and 2.
Figure 4:
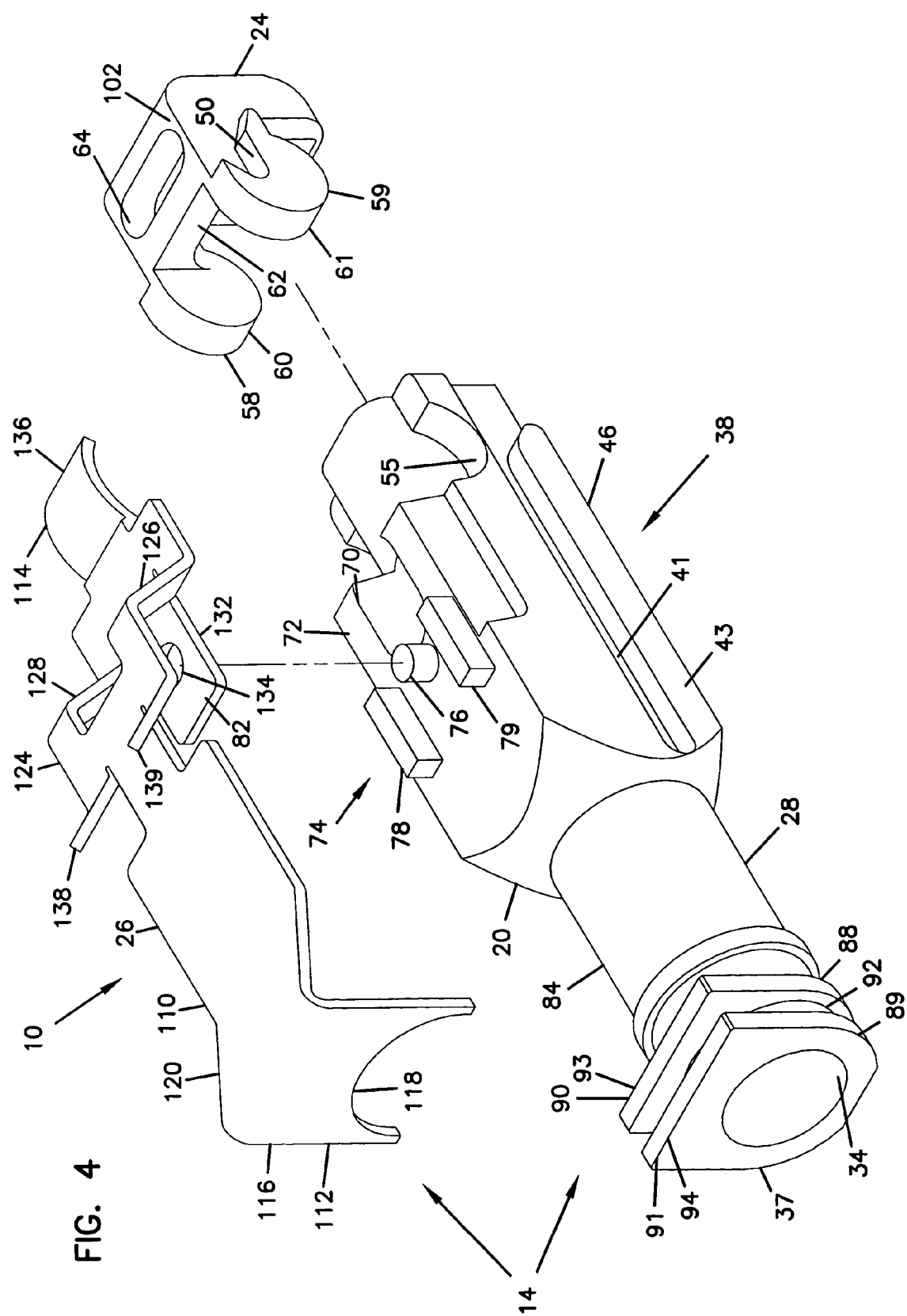
FIG. 4 is an exploded, top, rear perspective view of the fiberoptic connector housing assembly of FIGS. 1 and 2.
Figure 8:
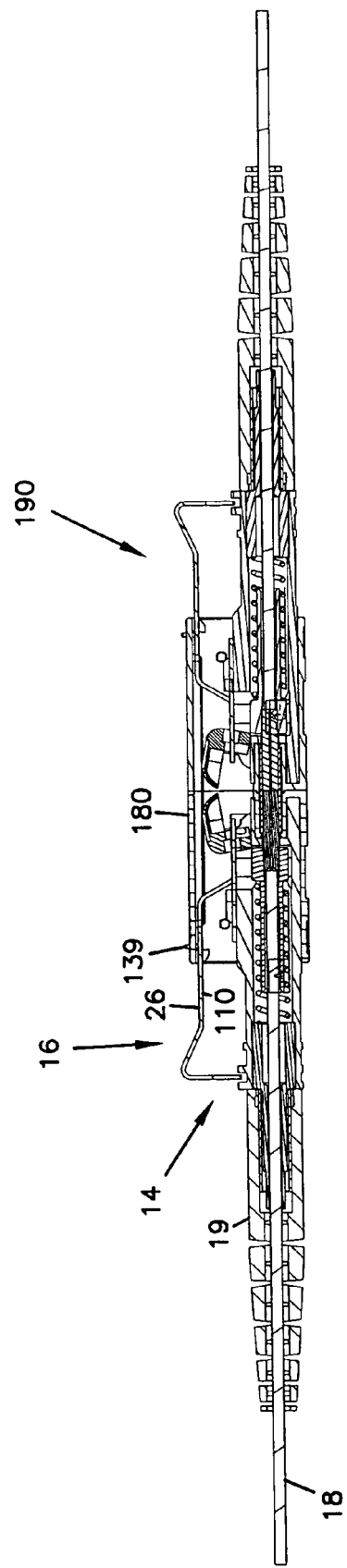
FIG. 8 is a cross-sectional view of the fiberoptic connector housing and cable assembly of FIGS. 1, 6, and 7 secured within an adapter to a second fiberoptic connector and cable assembly.

Attention is directed to FIGS. 3 and 4, which show exploded views of the fiberoptic connector 10. The housing 20 includes a front end 36 that defines the opening 32. A terminal end of the optical fiber 22 extends through the opening 32. The wall 28 includes a longitudinal connector guide 38 in the form of a pair of longitudinally extending slots 40, 41 on opposite sides 42, 43 of the housing 20. Preferably, the slots 40, 41 are parallel to a longitudinal axis 44 that runs along the housing 20. The slots 40, 41 are also preferably spaced from a bottom or base 46 of the housing 20. In preferred embodiments, the slots 40, 41 are positioned to receive guide rails in an adapter, such as the adapter described in U.S. Pat. No. 6,142,676 to Lu, and assigned to ADC Telecommunications, Inc. of Minnetonka, Minn., the assignee of this patent. U.S. Pat. No. 6,142,676 and its parent, U.S. Pat. No. 5,883,995, are incorporated by reference herein. An example of an adapter is shown in FIG. 8 at 180. The adapter 180 in FIG. 8 is connecting the assembly 16 to a second fiberoptic connector and cable assembly 190.

Figure 5:
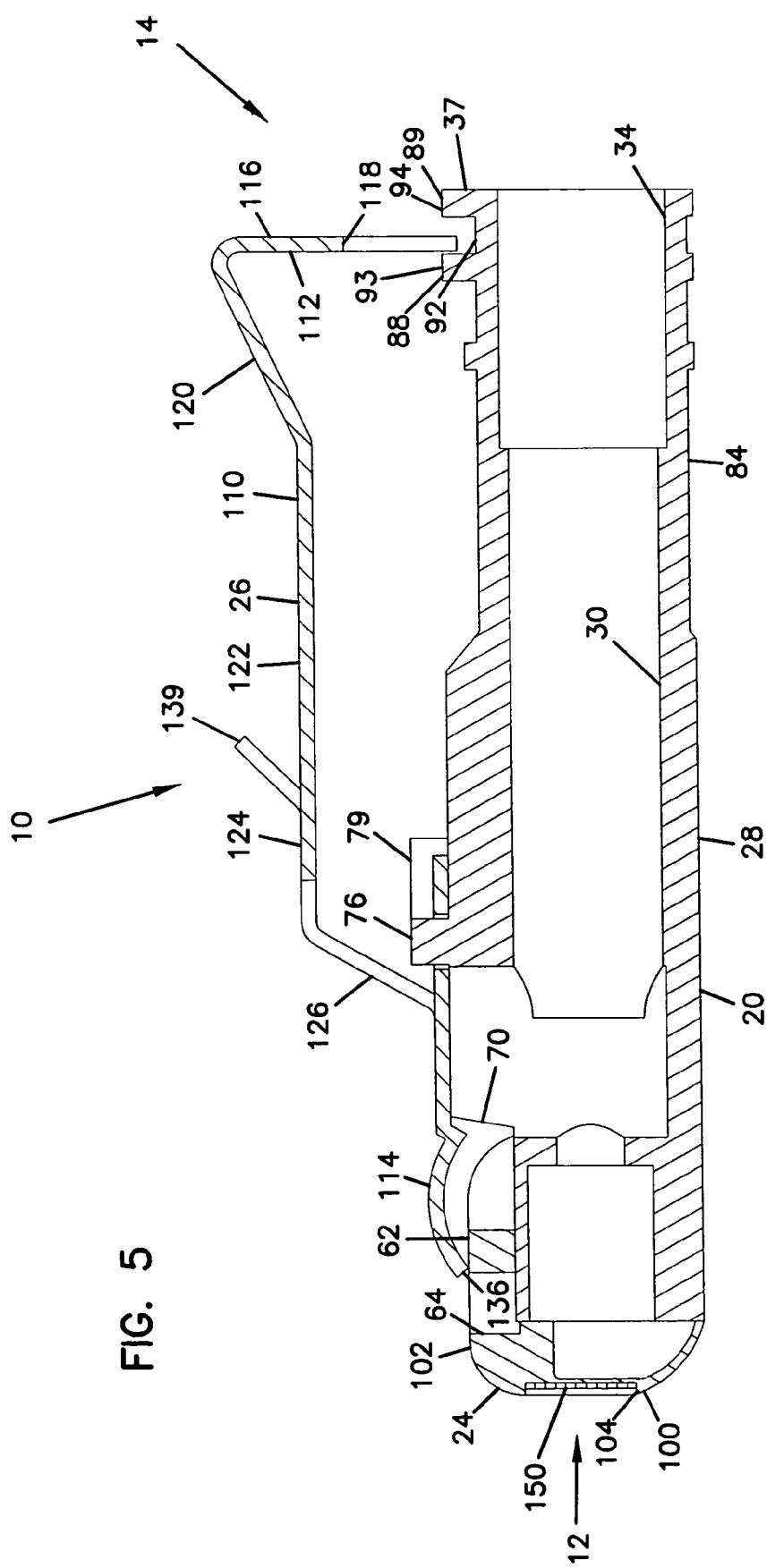
FIG. 5 is a cross-sectional view of the fiberoptic connector housing assembly of FIGS. 2–4; the cross-section being taken along the line 5—5 of FIG. 2.

The cover 24 is pivotally secured to the connector housing 20 to pivot about an axis 48, which is orthogonal to the longitudinal axis 44 and spaced rearwardly of the front face 36. FIGS. 1, 5, and 6 show the cover 24 in a closed position, while FIG. 7 shows the cover 24 pivoted to an open position that exposes the opening 32.

The cover 24 includes a cam pin receiving slot 50 positioned to receive a pin integral with adapter 180, as described in U.S. Pat. No. 6,142,676, when the cover 24 is in the closed position as the connector 10 is inserted into the adapter 180. The pin rotates the cover 24 into the open position. As described in U.S. Pat. No. 6,142,676, removal of the connector 10 from the adapter 180 reverses the action, so that the pin causes the cover 24 to pivot to the closed position. The manner in which the fiberoptic connector 10 interacts with the adapter 180 described in U.S. Pat. No. 6,142,676 is known and is as described in U.S. Pat. No. 6,142,676.

The housing 20 defines a pair of curved seats 54, 55 on opposite sides 42, 43, respectively, of the housing 20. The curved seats 54, 55 support and hold the cover 24 in place. Further, the curved seats 54, 55 allow the cover 24 to pivot and move smoothly between its open and closed positions. The cover 24 includes a pair of hinge mounts 58, 59, each having a curved surface 60, 61, (FIG. 4) respectively, that is sized to smoothly engage seats 54, 55 to allow the cover 24 to pivot. Extending between the hinge mounts 58, 59 is a rod 62. Adjacent to the rod 62 is a slot, in particular, an aperture 64 extending through the cover 24. As will be described further below, a portion of the stamping 26 interacts with the cover 24, in particular the rod 62 and aperture 64, to help hold the cover 24 in place relative to the housing 20. In preferred embodiments, the cover 24 is secured to the housing 20 in fastener-free construction. By "fastener-free construction", it is meant that there are no screws, rivets, pins, bolts or other types of fasteners physically connecting the cover 24 to the housing 20.

The housing wall 28 defines an opening 70 through a top portion 72 of the wall 28. The opening 70 helps to dissipate and emit heat from the internal volume 30 of the connector 10. Along the top portion 72, there includes structure 74 to help secure the stamping 26 to the housing 20. In particular, the structure 74 includes a pin 76 projecting upwardly from the top portion 72 of the wall 28. Adjacent to the pin 76 is a first and a second bar 78, 79. Each of the bars 78, 79 is adjacent to a respective side 42, 43. As will be described below, the stamping 26 includes a heel 82 that mateably engages the structure 74 to help hold the stamping 26 relative to the housing 20. Between the rear end 37 and the top portion 72 defining the mounting structure 74 is a cylindrical body 84 of the housing 20. Extending from and projecting from the body 84 is a plurality of cooling fin structure 86. In general, the fin structure 86 helps to dissipate heat from the optical cable 18 by radiating it therefrom. In the particular embodiment illustrated in the FIGS., the fin structure 86 includes at least a first fin 88 and a second fin 89. As can be seen in FIG. 4, in preferred embodiments, the fins 88, 89 generally have the shape of a truncated circle, each having a projecting tail 90, 91 having straight, parallel edges 93, 94. In the particular embodiment illustrated, the first and second fins 88, 89 are spaced apart from each other to define a receiving gap 92 therebetween. As will be explained below, the receiving gap 92 communicates with a portion of the stamping 26.

In preferred embodiments, the housing 20 is constructed entirely of metal. In this manner, the housing 20 will not melt from the heat generated by the fiber optic cable 18, even when powers up to 2 watts are transmitted therethrough.

Still in reference to FIGS. 3 and 4, the cover 24 includes a face 100, which operates to block the opening 32, when the cover 24 is in its closed position relative to the housing 20. The face 100 is generally orthogonal to a base 102. The base 102 defines the aperture 64, as described above. Further, in this particular embodiment, the face 100 defines a window 104 that holds and exposes the indicating arrangement 12. The indicating arrangement 12 will be described further below. Preferably, the cover 24 is constructed entirely of metal.

Still in reference to FIGS. 3 and 4, the stamping 26 is now further described. Preferably, the stamping 26 is secured to and projects from the connector housing 20. In preferred embodiments, the stamping 26 extends along at least 50 percent, and more preferably, 75–90 percent of the length of the connector housing 20 parallel to the longitudinal axis 44. In preferred embodiments, the stamping 26 includes a flange 110 cantilevered from the housing 20. Preferably, the flange 110 includes the heel 82 attached to the housing 20. On opposite sides of the heel 82 are a free end 112 and a lid 114. An end wall 116 defines the free end 112. The end wall 116 defines a curved opening or slot 118. When the flange 110 is assembled and secured to the housing 20, the slot 118 is in communication with and received by the receiving gap 92 between the first and second fins 88, 89. This engagement between the cooling fins 88, 89 and the flange 110 helps to further dissipate and radiate heat.

A ramp surface 120 is angled relative to the end wall 116. In preferred embodiments, the ramp surface 120 is angled acutely, preferably about 45–85 degrees relative to the end wall 116. An extension 122 extends from the ramp surface 120 to a fork 124. The fork 124 extends between the extension 122 and the heel 82. In the preferred embodiment illustrated, the fork 124 is angled relative to the extension 122, at an obtuse angle. In the one shown, the angle is shown to be 95–140 degrees. As can be seen in FIG. 3, the fork 124 includes first and second tongs 126, 128 with the heel 82 being oriented therebetween.

In preferred embodiments, the heel 82 is a planar structure 129 having a pair of straight, parallel sides 131, 132. The planar structure 129 defines a hole or aperture 134.

To assemble the flange 110 onto the housing 20, the sides 131, 132 are placed between and against the bars 78, 79 of the mounting structure 74. The aperture 134 receives the pin 76. Preferably, the flange 110 is then staked to the housing 20 at the intersection of the aperture 134 and the pin 76.

Projecting from the heel 82 is the lid 114. When the flange 110 is secured to the housing 20, the lid 114 extends over a portion of the cover 24. In particular, the lid 114 defines a tip 136 that extends over the rod 62. When the cover 24 is pivoted into an open position, the end of tip 136 is received within the slot or aperture 64, and preferably penetrates the aperture 64. When the cover 24 is in the closed position, the lid 114 presses on and engages the rod 62 to help hold the cover 24 in place relative to the housing 20.

In preferred embodiments, the flange 110 further includes a plurality of tabs 138, 139 extending from and projecting from the extension 122. As can be seen in FIGS. 3 and 5, the tabs 138, 139 are bent from the extension 122 at an angle. In the particular embodiment illustrated, the angle is an acute angle, such as between 10–80 degrees. The tabs 138, 139 help to further radiate heat from the fiberoptic connector 10.

The tabs 138, 139 also help to secure the connector 10 to the adapter 180, as shown in FIG. 8.

As mentioned previously, the fiberoptic connector 10 preferably includes indicating arrangement 12 that provides a signal when the temperature of the fiberoptic connector 10 crosses a trigger point, or threshold. In other words, when the fiberoptic connector 10 is carrying an energized optical fiber 22, the optical fiber 22 will radiate heat, that will raise the temperature of the connector housing 20. The indicating arrangement 12 will provide a signal by sensing the temperature to indicate that the connector 10 is carrying an energized optical fiber 22. Further, when the optical fiber 22 is not energized, the indicating arrangement 12 will sense the lower temperature of the housing 20 and will provide a signal that the optical fiber 22 is not energized, and is thus safe to visually inspect.

In preferred embodiments, the indicating arrangement 12 provides a visual signal. The visual signal could be in the form of lights, indicia, digital or analog readouts, to cite of few examples of those possible. In the preferred embodiment, the visual signal is a color change. In particular, the indicating arrangement 12 includes a temperature sensitive strip 150 that is affixed to any portion of the connector housing 20. The strip 150 can be secured to any portion of the housing 20, since the housing 20 is constructed of metal and will radiate heat from all portions. In the particular embodiment illustrated, the strip 150 is shown as being secured to the window 104 of the cover 24. The temperature sensitive strip 150 is constructed and arranged to change color when a temperature of the connector housing 20 reaches a threshold level.

For example, when the optical fiber 22 is not energized, the strip 150 will be a first color, such as black. After the optical fiber 22 is energized, the optical fiber 22 will emit heat. This heat will be sensed by the strip 150, which will cause a change in color of the strip 150, once the temperature exceeds a certain amount. For example, once the temperature exceeds 180° F., the strip 150 will change from the first color (such as black) to a second color (such as red or blue or white). This will provide a signal to the user that the optical fiber 22 is energized, and the user should not open the cover 24 to visually inspect the fiber 22. Once the optical fiber 22 is not energized and is not carrying power, the temperature of the housing 20 will drop, and the temperature sensitive strip 150 will sense this. The temperature sensitive strip 150 will change from its second color back to its first color, after passing the trigger point.

The temperature sensitive strip 150 can be made from temperature sensitive liquid crystal sheets. This is available from Edmond Optics, 101 E. Glouchester Pike, Barrington, N.J. 08007.

In reference now to FIGS. 6 and 7, the internal structure of the fiberoptic connector 10 can be seen. In particular, the fiberoptic connector 10 includes optical fiber 22 surrounded by an optical ferrule 160. A jacket 162 covers the optical fiber 22 from where the ferrule 160 ends. A hub 164 holds the ferrule 160. Spring 166 can be seen urging the hub 164 toward the front face 36 of the connector 10. A further outer protective layer (not shown) and an inner strength member, for example, Kevlar (not shown), are provided around cable 18, for protecting jacket 162 and for crimping to a rear housing portion 163 of housing 20 with a crimp ring 165.

In use, a method for indicating an energized fiberoptic connector may include providing a fiberoptic connector, such as the connector 10 shown in FIGS. 1–8, including housing 20 holding the optical fiber 22 therewithin. A temperature of the fiberoptic connector 10 is sensed, and a signal is provided when the temperature of the fiberoptic connector 10 crosses a threshold.

Preferably, the step of providing the fiberoptic connector 10 includes providing housing 20 having at least a portion of a first color, and the step of providing a visual signal includes changing the portion of the first color to a second color when the temperature of the fiberoptic connector 10 crosses a trigger point.

In preferred embodiments, the step of providing the fiberoptic connector 10 includes providing the housing 20 having the temperature sensitive strip 150 secured thereto, wherein the temperature sensitive strip 150 has the first color. Preferably, the step of changing the portion of the first color includes changing the first color of the temperature sensitive strip 150 to the second color when the temperature of the fiberoptic connector 10 crosses a trigger point.

In preferred embodiments, the step of providing a fiberoptic connector 10 includes providing a housing 20 having the openable and closeable cover 24 connected thereto. Preferably, the temperature sensitive strip 150 is secured to the cover 24.

In use, a method of dissipating heat from a fiberoptic connector includes providing a fiberoptic connector, such as the connector 10 described above. The connector 10 preferably includes metal housing 20 operably holding energized optical fiber 22. The housing 20 includes the plurality of fins 86. Further, there is preferably the metal stamping 26 secured to and projecting from the housing 20. The method preferably includes radiating heat generated by the energized optical fiber 22 through the metal housing 20, the plurality of fins 86 and the metal stamping 26.

It is intended that the specification and illustrated embodiments be considered as exemplary only. Many embodiments of the invention can be made.

What is claimed is:

1. A fiberoptic connector comprising:
    (a) a connector housing defining an interior volume sized to hold an optical fiber and an opening in communication with said interior volume;
    (b) a cover pivotally connected to said connector housing; said cover being constructed and arranged to pivot between an open position exposing said opening and a closed position covering said opening; and
    (c) a temperature indicator including:
        (i) a temperature sensitive strip secured to said cover;
            (A) said temperature sensitive strip being constructed and arranged to change color when a temperature of said connector housing reaches a threshold level.
2. A fiberoptic connector according to claim 1 wherein:
    (a) said connector housing and said cover each comprises metal.
3. A fiberoptic connector according to claim 2 wherein:
    (a) said connector housing includes a plurality of fins projecting therefrom.
4. A fiberoptic connector according to claim 3 further including:
    (a) a stamping secured to and projecting from said connector housing;
        (i) said stamping comprises metal.
5. A fiberoptic connector according to claim 1 further including:
    (a) an optical fiber oriented within said interior volume of said connector housing.
6. A fiberoptic connector according to claim 5 wherein:
    (a) said optical fiber is operably energized to carry 2 watts of power.
7. A fiberoptic connector according to claim 1 wherein:
    (a) said temperature sensitive strip is made from temperature sensitive liquid crystal sheets.
8. A fiberoptic connector according to claim 1 wherein:
    (a) said cover defines a window, said temperature sensitive strip being secured to said window of said cover.
9. A fiberoptic connector according to claim 8 wherein:
    (a) said cover includes a front face, said window being defined in said front face of said cover.
10. A fiberoptic connector according to claim 9 wherein:
    (a) said cover includes a base, said front face of said cover being orthogonal to said base.
11. A fiberoptic connector according to claim 1 wherein:
    (a) said temperature sensitive strip changes from a first color to a second color when said temperature of said connector housing reaches said threshold level, said first color being black.
12. A fiberoptic connector according to claim 11 wherein:
    (a) said second color is red, blue, or white.
13. A fiberoptic connector according to claim 1 wherein:
    (a) said threshold level includes temperatures exceeding 180° F.
14. A method for indicating an energized fiberoptic connector; the method comprising:
    (a) providing a fiberoptic connector including a housing, an openable and closable cover, and a temperature sensitive strip; the housing holding an optical fiber therewithin; the cover being connected to the housing; and the temperature sensitive strip being secured to the cover; the temperature sensitive strip having a first color;
    (b) sensing a temperature of the fiberoptic connector; and
    (c) providing a visual signal when the temperature of the fiberoptic connector crosses a trigger point including changing the first color of the temperature sensitive strip to a second color when the temperature of the fiberoptic connector crosses a trigger point.
15. A method according to claim 14 wherein:
    (a) said step of providing a fiberoptic connector includes providing an openable and closable cover having a base and a front face orthogonal to said base, said front face of said cover defining a window.
16. A method according to claim 14 wherein:
    (a) said step of providing a fiberoptic connector includes providing a temperature strip made of sensitive liquid crystal sheets.
17. A method according to claim 14 wherein:
    (a) said step of providing a visual signal when the temperature of the fiberoptic connector crosses a trigger point includes providing said visual signal when the temperature exceeds a trigger point of 180° F.
18. A method according to claim 14 wherein:
    (a) said step of changing the first color of said temperature sensitive strip to a second color includes changing the color from black to red, blue, or white.
19. A fiberoptic connector comprising:
    (a) a connector housing defining an interior volume sized to hold an optical fiber and an opening in communication with said interior volume;
    (b) a pivoting cover connected to said connector housing, said pivoting cover defining a window; and
    (c) a temperature sensitive strip secured to said window of said pivoting cover; said temperature sensitive strip being constructed and arranged to change color when a temperature of said connector housing reaches a threshold level.
20. A fiberoptic connector according to claim 19 wherein:
    (a) said pivoting cover includes a front face, said window being defined in said front face of said pivoting cover.
21. A fiberoptic connector according to claim 20 wherein:
    (a) said pivoting cover includes a base, said front face of said pivoting cover being orthogonal to said base.
22. A method for indicating an energized fiberoptic connector; the method comprising:
    (a) providing a fiberoptic connector including a housing holding an optical fiber therewithin, and a cover; the housing including a temperature sensitive strip secured thereto; the temperature sensitive strip having a first color; the cover having a base and a front face orthogonal to said base, said front face of said cover defining a window;
    (b) sensing a temperature of the fiberoptic connector; and
    (c) providing a visual signal when the temperature of the fiberoptic connector crosses a trigger point including changing the first color of the temperature sensitive strip to a second color when the temperature of the fiberoptic connector crosses a trigger point.
23. A method for indicating an energized fiberoptic connector; the method comprising:
    (a) providing a fiberoptic connector including a housing holding an optical fiber therewithin, and a cover; the cover including a temperature strip having a first color, the temperature strip being made of sensitive liquid crystal sheets;
    (b) sensing a temperature of the fiberoptic connector; and (c) providing a visual signal when the temperature of the fiberoptic connector crosses a trigger point including changing the portion of the first color to a second color when the temperature of the fiberoptic connector crosses a trigger point.

24. A method for indicating an energized fiberoptic connector; the method comprising:
(a) providing a fiberoptic connector including a housing and a cover, the cover including a temperature strip having a first color, the temperature strip being made of sensitive liquid crystal sheets, the housing holding an optical fiber therewithin; and
(b) indicating when the optical fiber of the fiberoptic connector is energized, including:
(i) sensing a temperature of the fiberoptic connector; and
(ii) providing a visual signal when the temperature of the fiberoptic connector crosses a trigger point including changing the first color of the temperature strip to a second color when the temperature of the fiberoptic connector crosses a trigger point.

25. A method according to claim 24 wherein:
(a) said step of providing a fiberoptic connector includes providing a housing and a cover having a base and a front face orthogonal to said base, said front face of said cover defining a window.

26. A method according to claim 24 wherein:
(a) said step of providing a visual signal when the temperature of the fiberoptic connector crosses the trigger point includes providing said visual signal when the temperature exceeds a trigger point of 180° F.

27. A method according to claim 24 wherein:
(a) said step of changing the first color of said temperature strip to a second color includes changing the color from black to red, blue, or white.

28. A fiberoptic connector comprising:
(a) a connector housing defining an interior volume;
(b) a number of optical components located within the interior volume of the connector housing, the optical components including:
(i) an optical fiber surrounded by an optical ferrule;
(ii) a hub that holds the optical ferrule; and
(iii) a spring arranged to urge the hub toward a forward position;
(c) a cover pivotally connected to said connector housing; said cover being constructed and arranged to pivot between an open position and a closed position; and
(d) a temperature indicator secured including a temperature sensitive strip secured to said cover, said temperature sensitive strip being constructed and arranged to change color when the optical fiber is energized, the energized optical fiber causing a change of temperature of said connector housing resulting in said change of color of said temperature sensitive strip.

29. A fiberoptic connector according to claim 28 wherein:
(a) said connector housing and said cover each comprises metal.

30. A fiberoptic connector according to claim 29 wherein:
(a) said connector housing includes a plurality of fins projecting therefrom.

31. A fiberoptic connector according to claim 30 further including:
(a) a stamping secured to and projecting from said connector housing;
(i) said stamping comprising metal.

32. A fiberoptic connector according to claim 28 wherein:
(a) said optical fiber is operably energized to carry 2 watts of power.

33. A fiberoptic connector according to claim 28 wherein:
(a) said temperature sensitive strip is made from temperature sensitive liquid crystal sheets.

34. A fiberoptic connector according to claim 28 wherein:
(a) said cover defines a window, said temperature sensitive strip being secured to said window of said cover.

35. A fiberoptic connector according to claim 34 wherein:
(a) said cover includes a front face, said window being defined in said front face of said cover.

36. A fiberoptic connector according to claim 35 wherein:
(a) said cover includes a base, said front face of said cover being orthogonal to said base.

37. A fiberoptic connector according to claim 28 wherein:
(a) said temperature sensitive strip changes from a first color to a second color when said temperature of said connector housing reaches a threshold level, said first color being black.

38. A fiberoptic connector according to claim 37 wherein:
(a) said second color is red, blue, or white.

39. A fiberoptic connector according to claim 28 wherein:
(a) said change of color occurs when said temperature of said connector housing exceeds 180° F.

40. A method for indicating an energized fiberoptic connector; the method comprising:
(a) providing a fiberoptic connector including a housing, an openable and closeable cover connected to the housing, and a temperature sensitive strip secured to the cover, the housing holding an optical fiber therewithin, the temperature sensitive strip having a first color; and
(b) indicating when the optical fiber of the fiberoptic connector is energized, including:
(i) sensing a temperature of the fiberoptic connector; and
(ii) providing a visual signal when the temperature of the fiberoptic connector crosses a trigger point including changing the first color of the temperature sensitive strip to a second color when the temperature of the fiberoptic connector crosses a trigger point.

41. A method for indicating an energized fiberoptic connector; the method comprising:
(a) providing a fiberoptic connector including a housing and a cover having a base and a front face orthogonal to said base, said front face of said cover defining a window, the housing holding an optical fiber therewithin, the housing having a temperature sensitive strip secured thereto, the temperature sensitive strip having a first color; and
(b) indicating when the optical fiber of the fiberoptic connector is energized, including:
(i) sensing a temperature of the fiberoptic connector; and
(ii) providing a visual signal when the temperature of the fiberoptic connector crosses a trigger point including changing the first color of the temperature sensitive strip to a second color when the temperature of the fiberoptic connector crosses a trigger point.

42. A fiberoptic connector comprising:
(a) a connector housing defining an interior volume;
(b) a number of optical components located within the interior volume of the connector housing, the optical components including:

(i) an optical fiber surrounded by an optical ferrule;
(ii) a hub that holds the optical ferrule; and
(iii) a spring arranged to urge the hub toward a frontward position;
(c) a pivoting cover connected to said connector housing, said pivoting cover defining a window; and
(d) a temperature indicator including a temperature sensitive strip secured to said window of said pivoting cover, said temperature sensitive strip being constructed and arranged to change color when the optical fiber is energized, the energized optical fiber causing a change of temperature of said connector housing resulting in said change of color of said temperature sensitive strip.

43. A fiberoptic connector according to claim 42 wherein:
(a) said pivoting cover includes a front face, said window being defined in said front face of said pivoting cover.

44. A fiberoptic connector according to claim 43 wherein:
(a) said pivoting cover includes a base, said front face of said pivoting cover being orthogonal to said base.

* * * * *